United States Patent [19]

Kluttz et al.

[11] Patent Number: 5,693,132
[45] Date of Patent: Dec. 2, 1997

[54] PHENOLIC ASPHALT BLENDS

[76] Inventors: Robert Quillin Kluttz, 15719 Sweetwater Creek Dr.; Robert Lawrence Blackbourn, 16410 Battlecreek Dr., both of Houston, Tex. 77095; Cary Alan Veith, 1506 Emerald Springs Ct., Houston, Tex. 77094; David Shawn Cushing, 1512 Jenny La., Richmond, Tex. 77469; James Laurel Buechele, 9316 Livernois, Houston, Tex. 77080

[21] Appl. No.: 769,647

[22] Filed: Dec. 18, 1996

Related U.S. Application Data

[60] Provisional application No. 60/008,990 Dec. 21, 1995.
[51] Int. Cl.[6] ............................................. C08L 95/00
[52] U.S. Cl. .............................. 106/273.1; 524/68
[58] Field of Search .......................... 106/273.1, 284; 524/66, 68

[56] References Cited

U.S. PATENT DOCUMENTS

| | | | |
|---|---|---|---|
| 3,891,585 | 6/1975 | McDonald | 524/59 |
| 4,068,023 | 1/1978 | Nielsen et al. | |
| 4,322,167 | 3/1982 | Hill | 366/8 |
| 4,450,306 | 5/1984 | Eskinazi | 568/658 |
| 5,256,710 | 10/1993 | Krivohlavek | 524/68 |
| 5,314,986 | 5/1994 | Ooms et al. | 528/219 |
| 5,322,867 | 6/1994 | Klutz et al. | 524/68 |
| 5,331,028 | 7/1994 | Goodrich | 524/68 |
| 5,397,818 | 3/1995 | Flanigan | 524/68 |
| 5,451,621 | 9/1995 | Usmani et al. | 524/68 |

FOREIGN PATENT DOCUMENTS

| | | |
|---|---|---|
| 469859 | 7/1991 | European Pat. Off. |
| 139945 | 1/1980 | German Dem. Rep. |
| 196222 | 1/1966 | U.S.S.R. |
| 783266 | 2/1980 | U.S.S.R. |
| 1491303 | 12/1975 | United Kingdom |

*Primary Examiner*—Peter A. Szekely
*Attorney, Agent, or Firm*—Todd F. Volyn

[57] ABSTRACT

An asphalt blend is presented in which asphalt is blended with a phenolic tar. The phenolic tar is primarily cumyl phenol and phenolic materials having a molecular weight of between about 300 and 1000. The tar is obtained as the bottoms product of a phenol heavy ends separation process and may also include phenol and acetophenone. A process for preparing this blend is also presented.

9 Claims, No Drawings

PHENOLIC ASPHALT BLENDS

FIELD OF THE INVENTION

This application claims the benefit of the filing of U.S. Provisional Patent Application 60/008,990 filed on Dec. 21, 1995 relating to asphalt materials and methods for improving the properties of the same.

BACKGROUND OF THE INVENTION

The use of asphalt in such applications as road pavements, roofing, coatings, and equipment liners is well known. The material is suitable for a range of conditions in many respects but displays some physical properties which would be desirable to improve. Efforts at improving such properties or extending the useful range of the materials have included adding certain conjugated diene rubbers, ethylene containing plastics such as EVA and polyethylene, neoprene, resins, fillers, and other modifiers to the asphaltic base materials. Frequently it is found that improving one aspect of the asphalt worsens another aspect. For example, some of the modified asphalts display excellent weather resistance, sealing and bonding properties but are deficient with respect to warm tack, modulus, hardness, or other physical properties.

To be suitable for paving materials, an asphalt blend should meet the following requirements:

(a) The blended materials must be compatible or made compatible. That is, they must be mixable in asphalt and stay mixed during subsequent processing. The polarity of materials to be blended with the polar asphaltene fraction is an important factor in this regard. Phase separation leading to a dramatic deterioration of physical properties can result from a lack of compatibility.

(b) The blend must exhibit good rheological properties. It is important that the blend not exhibit rutting which is the permanent deformation of a road caused by repetitive traffic loads. Viscoelasticity over a range of temperatures is important particularly in warm climates., (c) The blend must have good resistance to cracking. Cooling can induce stresses due to nonuniform shrinkage. Of course, traffic over a road also induces stress. This stress can induce cracking. One object of asphalt blending is to increase this resistance to cracking. At a minimum, improvements to other properties of the asphalt should not be attained at a cost of significant increases in the asphalt's tendency to crack. This characteristic is particularly important in cold climates.

To be suitable for use in roofing materials, the asphalt blend should meet the following requirements: (a) Resistance to flow at high temperatures, (b) Flexibility at low temperatures, (c) Workability, (d) Hot storage stability, (e) Hardness sufficient to prevent deformation upon exposure to stresses (eg., when during work on a roof), and (f) Adhesion (in the case of adhesive roofing materials).

Japanese published patent application 88002985 to Dainippon Toryo proposes a bitumen material prepared by treating coal with tax under heating. The tar is a byproduct produced in the preparation of phenols which is condensed with paraformaldehyde in the presence of a catalyst. The material produced is a solid or semisolid material until heating and requires an off-line chemical condensation reaction process to prepare the blending agent.

Japanese published patent application 79002642 to Hitachi Chemical proposes an asphalt composition which include a resin. The resin is prepared by reacting an aldehyde with the distillation byproduct produced during the purification of alkyl phenols from isobutylene oligomer and phenol. Producing the material to be blended with the asphalt also requires an off-line chemical reaction process.

U.S. Pat. No. 5,256,710 to Krivohlavek proposes adding a crosslinking or vulcanizing agent to a polymer modified asphalt. The phenolic or phenol-formaldehyde crosslinking agent must be capable of crosslinking the polymer added to the asphalt.

U.S. Pat. No. 5,397,818 to Flanigan proposes the addition of ground tire rubber and distillation tower bottoms (DTB) to asphalt. The components of the distillation tower bottoms are not revealed and the process from which they are obtained is essentially a petroleum refining process. Thus, DTBs are bitumens and are not the phenolic tars of this invention.

Asphalt blends which expand the useful range of desirable asphalt properties are always welcomed in the art. This is particularly true where the agents to be blended together with the asphalt do not require extraordinary preparation or can be readily obtained as byproducts that would otherwise have little economic value or would present disposal problems.

SUMMARY OF THE INVENTION

This invention is an asphalt blend comprising asphalt and phenolic tar. The phenolic tar can comprise about 0.1–5% wt of the blend and can be obtained as a byproduct of phenolic heavy ends separation during the production of phenol.

In a preferred embodiment of the invention, the phenolic tar comprises less than 4 % wt phenol, less than 5% wt acetophenone, at least about 10% wt cumylphenols, and at least 81% wt heavy phenolic materials.

In another preferred embodiment of the invention, the phenolic tar consists essentially of cumylphenols and heavy phenolic materials.

In yet another preferred embodiment of the invention, the asphalt blend further comprises a thermoplastic elastomer, preferably a styrene-butadiene-styrene (SBS) block copolymer.

This invention presents compatible asphalt blends which display improved high temperature viscosity of the asphalt composition without increasing the low temperature stiffening and thus increase the effective range of the asphalt.

DETAILED DESCRIPTION OF THE INVENTION

The composition of this invention is a blend of asphalt and asphalt modifiers. The modifiers are phenolic tars and, optionally, one or more polymeric materials. Preferably, the polymer, when employed, is a thermoplastic elastomeric material ("elastomer"). The phenolic tars can be the bottoms product obtained from the separation of phenol from other species in a phenol production process. The composition has many uses such as in the roofing and paving industries.

The composition is a blend which is simple and economical to prepare. Accordingly, the process of this invention includes mixing the phenolic tars with asphalt until a blend is formed. Mild heating and stirring will generally be useful in blending the materials. Other process steps may include the substantial removal of phenol and acetophenone from the phenolic tar and the addition of elastomer. No additional additives, modifiers, or compatibilizers are necessary although they may be used if desired. Any conventional method of mixing can be employed to practice the process provided that it contributes to good dispersion of the phenolic derivative throughout the asphalt. The order in which the blend components are mixed is also not important. Thus, in the embodiment of this invention in which polymer is a blend component, it is not important whether asphalt and polymer are first mixed, asphalt and phenolic tar are first mixed, polymer and phenolic tar are first mixed, or all are mixed simultaneously.

The asphalt employed in this invention can be either a naturally occurring asphalt or a manufactured asphalt produced by refining petroleum. Naturally occurring asphalts suitable for use in this invention include, for example, lake asphalts, rock asphalts and the like. Suitable manufactured asphalts include, for example, straight run asphalts, propane asphalts, air-blown asphalts, thermal asphalts, blended asphalts and the like. Generally, such asphalts have an initial viscosity at 60° C. of from about 100 to about 20,000 poise. The term "initial viscosity" refers to the viscosity of the asphalt before the addition of the blend components according to this invention. Preferred asphalts include those referred to as "Wood River" asphalts commercially available from Shell Oil Company and sold under designations such as "WRAC 5" and "WRAC 10". However, any asphalt useful in roofing and paving applications can be used in the blends of this invention as practice of the invention is not limited by selection of any particular asphalt.

The phenolic tar of this invention includes those materials which are obtained as bottoms products during phenol preparation and separations in phenol production processes. Decomposition of cumene hydroperoxide (CHP) is a preferred process for the production of phenols in integrated chemical manufacturing. In such process, alpha methylstyrene (AMS), cumene, and phenol are obtained as products of the CHP decomposition under acidic conditions. Further phenol preparation and separation steps are done according to methods well known in the art. For example, at one stage of the process, a feed comprising about 20% wt phenol, 15% wt acetophenone, 15% wt AMS, and 20% wt cumylphenols are thermally cracked in a phenol heavy ends column. In this process the feed is given a residence time in the column of about 50-70 hours at about 600° F. Cumene, AMS, and phenol are withdrawn as light ends. Phenolic tar is comprised of the heavy ends. This tar includes phenol, acetophenone, cumylphenols and heavy phenolic materials. Small amounts of other constituents should also be expected. For example, such tar will ordinarily also comprise about 3000 ppmw $Na_2SO_4$. Heavy phenolic materials are phenolic derivatives having an average molecular weight between about 300 and 1000, preferably between about 400 and 500. Ordinarily, phenolic tar is removed from the process as a waste material. Therefore, it is a particular advantage of this invention that it can be used to improve asphalt because a more valuable product is obtained by using a material which would otherwise represent a cost to the overall operation of an integrated chemical manufacturing facility.

While it is desired that the phenolic tar can be obtained from the phenol production process it can also be obtained from any other source of such materials. Thus, phenolic tar can be synthesized by the components of the tar irrespective of the source of those components. Typically, phenolic tar will have the following composition: 2-4% wt phenol, 3-5% wt acetophenone, 10-20% wt cumylphenols (eg., p-cumylphenol), 81-85% wt heavy phenolic materials, and about 3000 ppmw $Na_2SO_4$.

Phenolic tar can simply be withdrawn from a phenol heavy ends column in a phenol process and then mixed with asphalt so that it comprises the blends of this invention. Preferably, the level of phenol and acetophenone in the phenolic tar are reduced prior to blending so that the total of both materials comprise less than about 1% wt of the phenolic tar. This can be accomplished through any of the conventional means of separation known to one skilled in the art. Reduction of the phenol and acetophenone levels improves the workability of the asphalt blend since these components will not then tend to volatilize under the working conditions in which the materials are used. Useful concentrations of phenolic tar are between 0.1 and 5.0% wt (basis total weight of blend). Preferably, such concentrations are between about 0.1 and 1% wt. Where polymer is included in the blend of this invention, it is preferred that the polymer comprise from 1 to 8 parts by weight per hundred parts by weight of asphalt. Preferably, where polymer is included in the blend, the blend comprises about 3% wt polymer. The polymers useful in the practice of this invention include SBS block copolymers having a molecular weight of from about 90,000 to about 750,000 and preferably from about 150,000 to about 250,000 with a polydispersity of up to about 1.01. Preferably, the SBS block copolymers are from about 27 to about 43 parts by weight styrene although other compositions are also useful. The most preferred SBS copolymers are commercially available from Shell Chemical Company under the tradename "KRATON" elastomers. However, the invention is also not limited by the selection of the polymer as other thermoplastic polymers can readily be used in the place of those mentioned above as one skilled in the art will appreciate.

Any number of other components typically added to asphalt compositions may also be blended in the practice of this invention. Other useful additives may include, for example, fillers such as ground tires, talc, calcium carbonate, and carbon black. The composition may also include resins and oils and other components such as stabilizers. It may also include other polymers such as polymers of conjugated diolefins.

The invention will now be further illustrated through the following nonlimiting examples.

EXAMPLES

Analyses were conducted using the SuperPave binder tests prescribed in AASHTO Provisional Standard M1. DSR is the dynamic shear modulus and provides a measurement of the stiffness of the asphalt. BBR refers to bending beam rheometer measurements. The protocol determines the PG grade or high and low temperature extremes which the material will tolerate with satisfactory performance.

Example 1

A 600 gram sample of WRAC 5 asphalt was stirred in a quart can using a Silverson L4R high shear mixer running at 3000 rpm. The sample was then analyzed according to the schema set forth above. The material has a PG grade of 52. Table 1 shows the results of this analysis:

TABLE 1

| PreRTFO | temperature | 52.1 | 58.3 | 64.3 |
|---|---|---|---|---|
| DSR G*/sinδ | value | 1930 | 861 | 403 |
| PostRTFO | temperature | 50 | 60.8 | 70.7 |
| DSR G*/sinδ | value | 9330 | 1810 | 474 |
| BBR S | temperature | −24 | −18 | |
| | value | 410 | 182 | |
| BBR m | temperature | −24 | −18 | |
| | value | 0.32 | 0.28 | |

Example 2

A 600 gram sample of WRAC 5 asphalt was stirred and heated to 180° C. A 0.2% wt (basis total blend) solution of phenolic tar (less than 4% wt phenol, less than 5% wt acetophenone, 10–20% wt cumylphenols, and 81–85% wt heavy phenolic materials—wt%, basis total weight of tar component) was added to the sample during this process. After addition, the blend was stirred for five additional minutes. A homogeneous mixture was obtained. This blend was then analyzed in the same manner as Example 1. Results are presented in Table 2:

TABLE 2

| PreRTFO | temperature | 51.8 | 57.9 | 63.9 |
| --- | --- | --- | --- | --- |
| DSR G*/sinδ | value | 2450 | 1110 | 487 |
| PostRTFO | temperature | 49.3 | 60.7 | 70.6 |
| DSR G*/sinδ | value | 4570 | 883 | 261 |
| BBR S | temperature | −24 | −18 | |
| | value | 393 | 178 | |
| BBR m | temperature | −24 | −18 | |
| | value | 0.33 | 0.26 | |

Comparing example 1 and example 2 it can be seen that the addition of phenolic tar raised the PG grade of the asphalt from 52–28 to 58–28. Thus, addition of the blending agent of this invention improves the temperature tolerance of the asphalt.

Example 3 (Comparative)

A 600 gram sample of WRAC 5 asphalt was stirred and heated to 180° C. While stirring, 3.0% wt of radial SBS polymer commercially available under the tradename "KRATON D1184" (a product of Shell Chemical Company) was added. Stirring was continued for 45 minutes to allow the polymer to dissolve. The sample was then analyzed in the manner described above. The results are presented in Table 3:

TABLE 3

| PreRTFO | temperature | 50.6 | 60.9 | 70.9 |
| --- | --- | --- | --- | --- |
| DSR G*/sinδ | value | 9020 | 2890 | 1080 |
| PostRTFO | temperature | 50.6 | 60.9 | 50.6 |
| DSR G*/sinδ | value | 22300 | 6340 | 1980 |
| BBR S | temperature | −18 | −12 | |
| | value | 154 | 92 | |
| BBR m | temperature | −18 | −12 | |
| | value | .30 | .31 | |

Example 4

Example 4 was prepared in the same manner as example 3 except that 0.2% wt phenolic tar was added to the sample after it was smooth and homogeneous. Stirring was continued for five minutes after phenolic tar addition. The sample was analyzed in the manner described above. The results are presented in table 4:

TABLE 4

| PreRTFO | temperature | 50.6 | 60.6 | 70.6 |
| --- | --- | --- | --- | --- |
| DSR G*/sinδ | value | 11,200 | 3750 | 1310 |
| PostRTFO | temperature | 50.6 | 60.9 | 70.9 |
| DSR G*/sinδ | value | 26,900 | 6620 | 2020 |
| BBR S | temperature | −18 | −12 | |
| | value | 153 | 91 | |
| BBR m | temperature | −18 | −12 | |
| | value | .30 | .32 | |

This examples shows that the addition of phenolic tar to the asphalt -polymer blend increases the high temperature performance of the material without significantly changing the low temperature performance.

We claim as our invention:

1. An asphalt blend comprising asphalt and phenolic tar comprising phenol, acetophenone, cumylphenols, and heavy phenolic materials.

2. The blend of claim 1 comprising 0.1–5% wt phenolic tar.

3. The blend of claim 2 wherein said phenolic tar is comprised of less than 4% wt phenol, less than 5% wt acetophenone, 10–20% wt cumylphenols, and 81–85% wt heavy phenolic materials.

4. The blend of claim 3 wherein said phenolic tar consists essentially of cumylphenols and heavy phenolic materials.

5. The blend of claim 3 further comprising 1000–3000 ppmw $Na_2SO_4$.

6. A process for modifying asphalt comprising:

a) withdrawing phenolic heavy ends from a phenol separation process, b) separating phenolic tar from other products, and b) mixing said phenolic tar with asphalt to form an asphalt-phenolic tar mixture.

7. The process of claim 6 where said phenolic tar comprises 0.1–5.0% wt of the asphalt-phenolic derivative mixture.

8. The process of claim 6 wherein said phenolic tar is comprised of 2–4% wt phenol, 3–5% wt acetophenone, 10–20% wt cumylphenols, and 81–85% wt heavy phenolic materials.

9. The process of claim 8 wherein said phenolic tar consists essentially of cumylphenols and heavy phenolic material.

* * * * *